(12) United States Patent
Takahashi et al.

(10) Patent No.: US 11,119,007 B2
(45) Date of Patent: Sep. 14, 2021

(54) VEHICLE UNDER TEST SECURING APPARATUS WITH INCREASED ALIGNMENT FREEDOM AND FORCE SENSING

(71) Applicant: MEIDENSHA CORPORATION, Tokyo (JP)

(72) Inventors: Toshimichi Takahashi, Ota (JP); Noriaki Hirokami, Midori (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/043,089

(22) PCT Filed: Feb. 14, 2019

(86) PCT No.: PCT/JP2019/005181
§ 371 (c)(1),
(2) Date: Sep. 29, 2020

(87) PCT Pub. No.: WO2019/187730
PCT Pub. Date: Oct. 3, 2019

(65) Prior Publication Data
US 2021/0018400 A1    Jan. 21, 2021

(30) Foreign Application Priority Data

Mar. 30, 2018   (JP) .............................. JP2018-069543
Mar. 30, 2018   (JP) .............................. JP2018-069544
Mar. 30, 2018   (JP) .............................. JP2018-069545

(51) Int. Cl.
*G01M 17/007*   (2006.01)
*B60T 1/04*     (2006.01)
*G01L 5/28*     (2006.01)

(52) U.S. Cl.
CPC .......... *G01M 17/0074* (2013.01); *B60T 1/04* (2013.01); *G01L 5/28* (2013.01)

(58) Field of Classification Search
CPC ................................................. G01M 17/0074
(Continued)

(56) References Cited

U.S. PATENT DOCUMENTS 3,796,084 A * 3/1974 Jarman .................... B21D 1/14
                                                72/447
4,643,015 A * 2/1987 Larson .................... B21D 1/14
                                                72/305
(Continued)

FOREIGN PATENT DOCUMENTS

GB    2551846 A    1/2018
JP    60-104751 U    7/1985
(Continued)

*Primary Examiner* — Eric S. McCall
*Assistant Examiner* — Timothy P Graves
(74) *Attorney, Agent, or Firm* — Foley & Lardner LLP

(57) ABSTRACT

A vehicle securing apparatus is provided for pulling and securing a test vehicle provided to a vehicle testing device. The column stands on the pedestal. The vehicle securing apparatus includes a column, a traveling and rotating part, and a pedestal. The traveling and rotating part is structured to be coupled with a chain for pulling the test vehicle, and arranged coaxially with the column, and structured to travel vertically and rotate horizontally. The pedestal is structured to be attached to an arbitrary portion of a slide rail of the vehicle testing device.

7 Claims, 8 Drawing Sheets

(58) Field of Classification Search
USPC .................................................... 73/116.06
See application file for complete search history.

(56) References Cited

U.S. PATENT DOCUMENTS

| | | | | |
|---|---|---|---|---|
| 4,848,132 A | * | 7/1989 | Saroli .................... | B21D 1/14 |
| | | | | 72/447 |
| 2005/0022587 A1 | * | 2/2005 | Tentrup ............... | G01M 13/025 |
| | | | | 73/116.06 |
| 2018/0045601 A1 | | 2/2018 | Hartmann et al. | |

FOREIGN PATENT DOCUMENTS

| | | |
|---|---|---|
| JP | 5-8454 U | 2/1993 |
| JP | 7-306122 | 11/1995 |
| JP | 8-43264 A | 2/1996 |
| JP | 2005-345396 A | 12/2005 |
| JP | 2010-112835 | 5/2010 |
| JP | 2010-210532 A | 9/2010 |

\* cited by examiner

FIG. 4

VEHICLE UNDER TEST SECURING APPARATUS WITH INCREASED ALIGNMENT FREEDOM AND FORCE SENSING

TECHNICAL FIELD

The present invention relates to a vehicle securing apparatus for restraining a test vehicle for road running simulation of the test vehicle in a room, wherein a roller on which a driving wheel of the test vehicle is mounted is connected to a dynamometer, and driving and braking forces of the test vehicle are transmitted to the dynamometer via the roller.

BACKGROUND ART

For road running simulation, a test vehicle is secured (or restrained) by a vehicle securing apparatus so as to prevent a driving wheel of the test vehicle from moving off a roller during testing. Patent documents 1 to 3 each disclose a vehicle securing apparatus that secures a test vehicle from a front side of the test vehicle or from front and rear sides of the test vehicle at or around a pit cover of a vehicle testing device.

PRIOR ART DOCUMENT(S)

Patent Document(s)

Patent Document 1: Japanese Patent Application Publication No. H7-306122
Patent Document 2: Japanese Patent Application Publication No. H8-43264
Patent Document 3: Japanese Patent Application Publication No. 2010-112835

SUMMARY OF INVENTION

In a conventional case where a test room is small or interference is to be avoided between a test vehicle and testing equipment, vehicle securing apparatuses are placed between a pair of existing slide rails on a pit cover, and on another pair of slide rails that are additionally provided in series with or perpendicularly to the existing slide rails.

However, arrangement of the vehicle securing apparatuses on the added pair of slide rails causes a decrease in flexibility (extendability) of position of each vehicle securing apparatus for pulling, so that it may be difficult to arrange the vehicle securing apparatuses as desired.

In particular, when the vehicle securing apparatus arranged close to the front of the test vehicle, it may be difficult to attach a pulling force sensor such as a load cell for measuring pulling force, and it may be impossible to ensure a distance required for pulling.

In case of the conventional vehicle securing apparatus, for varying the position for pulling the test vehicle, it is required to vary the direction of a pedestal of the vehicle securing apparatus. This adversely affects work efficiency in adjusting the position for pulling the test vehicle.

As discussed above, the conventional vehicle securing apparatus is difficult to flexibly adapt to test environments where the vehicle securing apparatus is placed at or around the pit cover.

In view of the foregoing, it is an object of the present invention to improve the flexibility of pulling a test vehicle for securing the test vehicle.

According to one embodiment of the present invention, a vehicle securing apparatus for pulling and securing a test vehicle provided to a vehicle testing device, the vehicle securing apparatus includes: a column; and a traveling and rotating part structured to be coupled with a chain for pulling the test vehicle, and arranged coaxially with the column, and structured to travel vertically and rotate horizontally.

According to one embodiment of the present invention, the vehicle securing apparatus includes a coupler structured to couple the traveling and rotating part with the chain.

According to one embodiment of the present invention, the coupler includes a sensor structured to sense a pulling force of the traveling and rotating part.

According to one embodiment of the present invention, the coupler is coupled with the traveling and rotating part in a manner to allow the sensor to be detached.

According to one embodiment of the present invention, the vehicle securing apparatus further includes a pedestal on which the column stands, wherein the pedestal is structured to be attached to an arbitrary portion of a slide rail of the vehicle testing device.

According to one embodiment of the present invention, the vehicle securing apparatus further includes a pair of casters attached to a longitudinally-extending edge portion of the pedestal, and structured to allow the vehicle securing apparatus to be moved.

According to one embodiment of the present invention, the vehicle securing apparatus further includes an auxiliary caster attached to the longitudinally-extending edge portion of the pedestal, and arranged between the pair of casters, and structured to assist the vehicle securing apparatus in being moved.

According to one embodiment of the present invention, a vehicle securing apparatus for pulling and securing a test vehicle provided to a vehicle testing device, the vehicle securing apparatus includes: a pedestal structured to be attached to an arbitrary portion of a slide rail of the vehicle testing device; a column standing on the pedestal; a pair of casters attached to a longitudinally-extending edge portion of the pedestal, and structured to allow the vehicle securing apparatus to be moved; and a caster movement handle attached to the column, and structured to be gripped during the movement of the vehicle securing apparatus.

According to one embodiment of the present invention, the vehicle securing apparatus further includes an auxiliary caster attached to the longitudinally-extending edge portion of the pedestal, and arranged between the pair of casters, and structured to assist the vehicle securing apparatus in being moved.

According to one embodiment of the present invention, a vehicle securing apparatus for assisting a second vehicle securing apparatus in pulling a test vehicle provided to a vehicle testing device when securing the test vehicle, the vehicle securing apparatus includes: a pedestal structured to be attached to an arbitrary portion of a slide rail of the vehicle testing device; a column standing on the pedestal; and a pulley structured to receive a chain, and arranged coaxially with the pedestal, and structured to travel vertically and rotate horizontally, wherein the chain connects the second vehicle securing apparatus and the test vehicle.

According to one embodiment of the present invention, the vehicle securing apparatus further includes a pair of casters attached to a longitudinally-extending edge portion of the pedestal, and structured to allow the vehicle securing apparatus to be moved.

According to one embodiment of the present invention, the vehicle securing apparatus further includes an auxiliary caster attached to the longitudinally-extending edge portion of the pedestal, and arranged between the pair of casters, and structured to assist the vehicle securing apparatus in being moved.

According to one embodiment of the present invention, the second vehicle securing apparatus includes: a second pedestal structured to be attached to an arbitrary portion of the slide rail; a second column standing in the vehicle testing device; and a traveling and rotating part structured to be coupled with the chain for pulling the test vehicle, and arranged coaxially with the second column, and structured to travel vertically and rotate horizontally.

The present invention described above serves to enhance the flexibility of pulling the test vehicle for securing the test vehicle.

BRIEF DESCRIPTION OF DRAWINGS

FIG. 4 shows (a) a front view of a vehicle securing apparatus according to a third embodiment of the present invention, (b) a side view of the vehicle securing apparatus, (c) a plan view of the vehicle securing apparatus, (d) a plan view showing an example of operation of the vehicle securing apparatus, and (e) a side view showing an example of movement of the vehicle securing apparatus.

MODE(S) FOR CARRYING OUT INVENTION

The following describes embodiments of the present invention with reference to the drawings.

Figure 1:
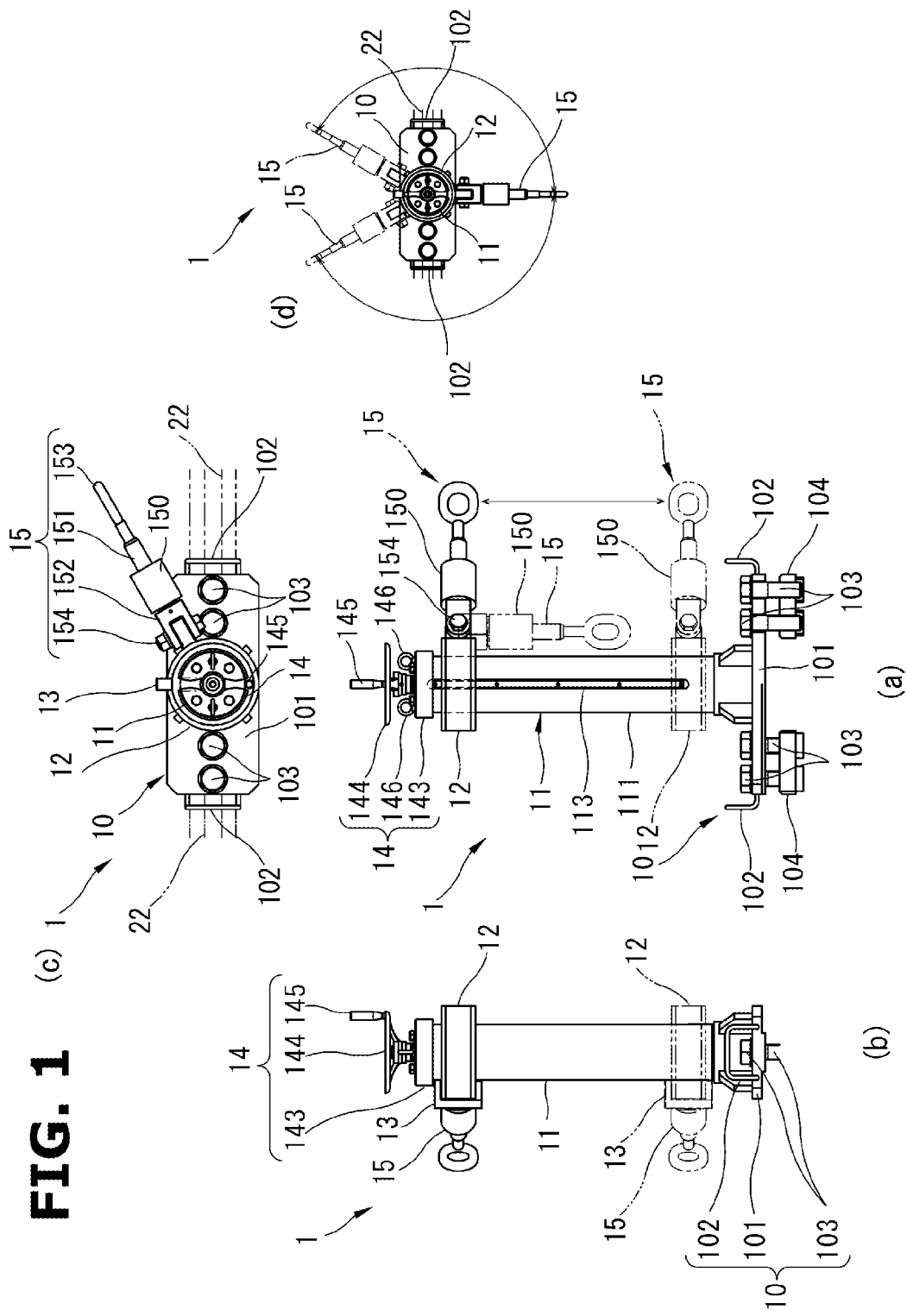
FIG. 1 shows (a) a front view of a vehicle securing apparatus according to a first embodiment of the present invention, (b) a side view of the vehicle securing apparatus, (c) a plan view of the vehicle securing apparatus, and (d) a plan view showing an example of operation of the vehicle securing apparatus.
Figure 3:
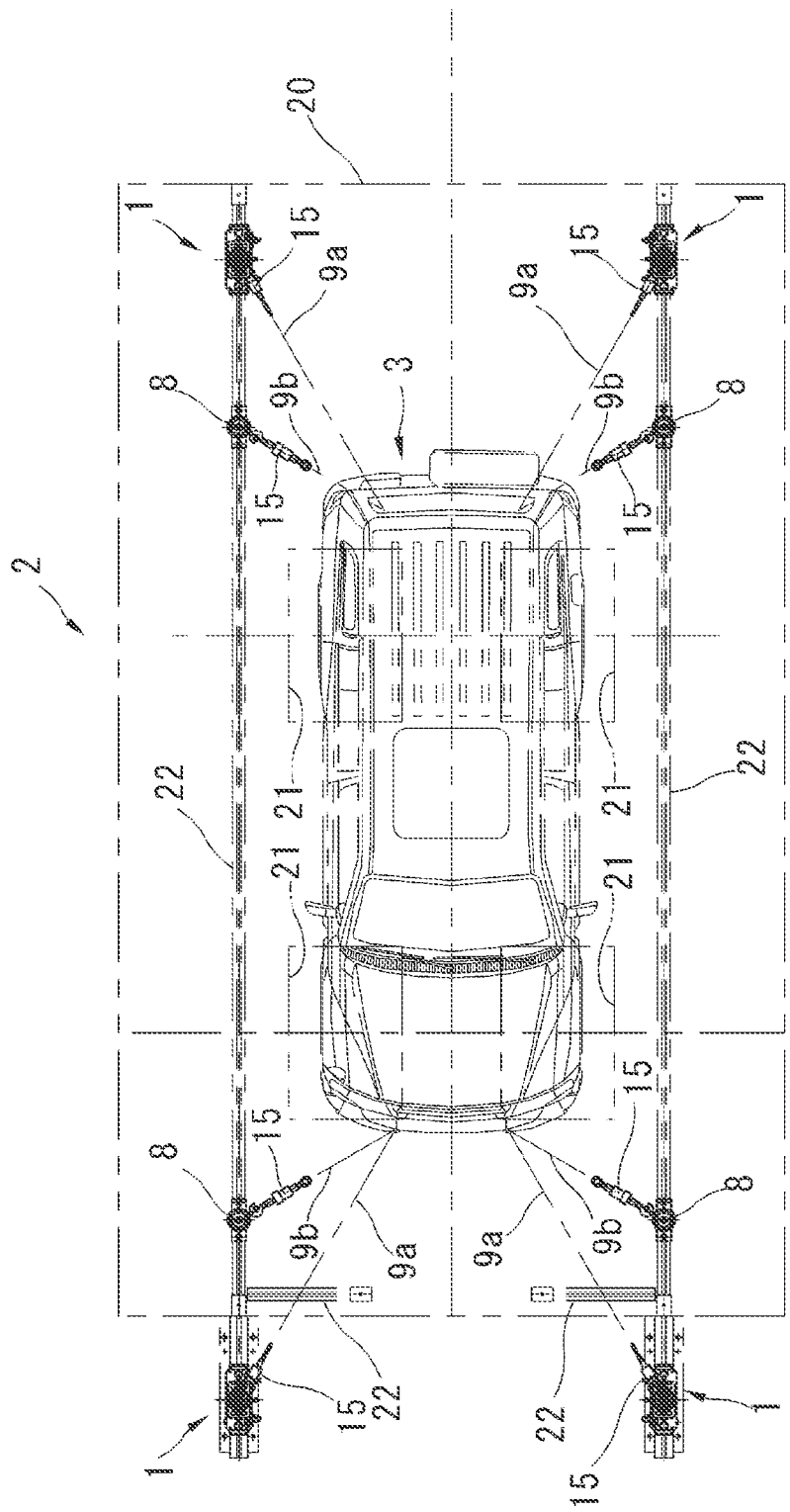
FIG. 3 shows a plan view showing an example of use of the vehicle securing apparatus of FIG. 1.

[First Embodiment] FIG. 1 exemplarily shows a vehicle securing apparatus 1 according to a first embodiment, which is structured to pull a test vehicle 3 and thereby secure the test vehicle 3 on a pit cover 20 of a vehicle testing device 2 shown in FIG. 3, wherein a road wheel not shown of the test vehicle 3 is placed on a roller not shown that is exposed through a roller opening 21 of the pit cover 20.

In particular, the vehicle securing apparatus 1 is structured to be mounted to an arbitrary position on a slide rail 22 placed on the pit cover 20 or outside the pit cover 20 as shown exemplarily in FIG. 3, wherein the height of a support point of the pulling and the direction of the pulling can be adjusted within respective predetermined ranges.

Figure 2:
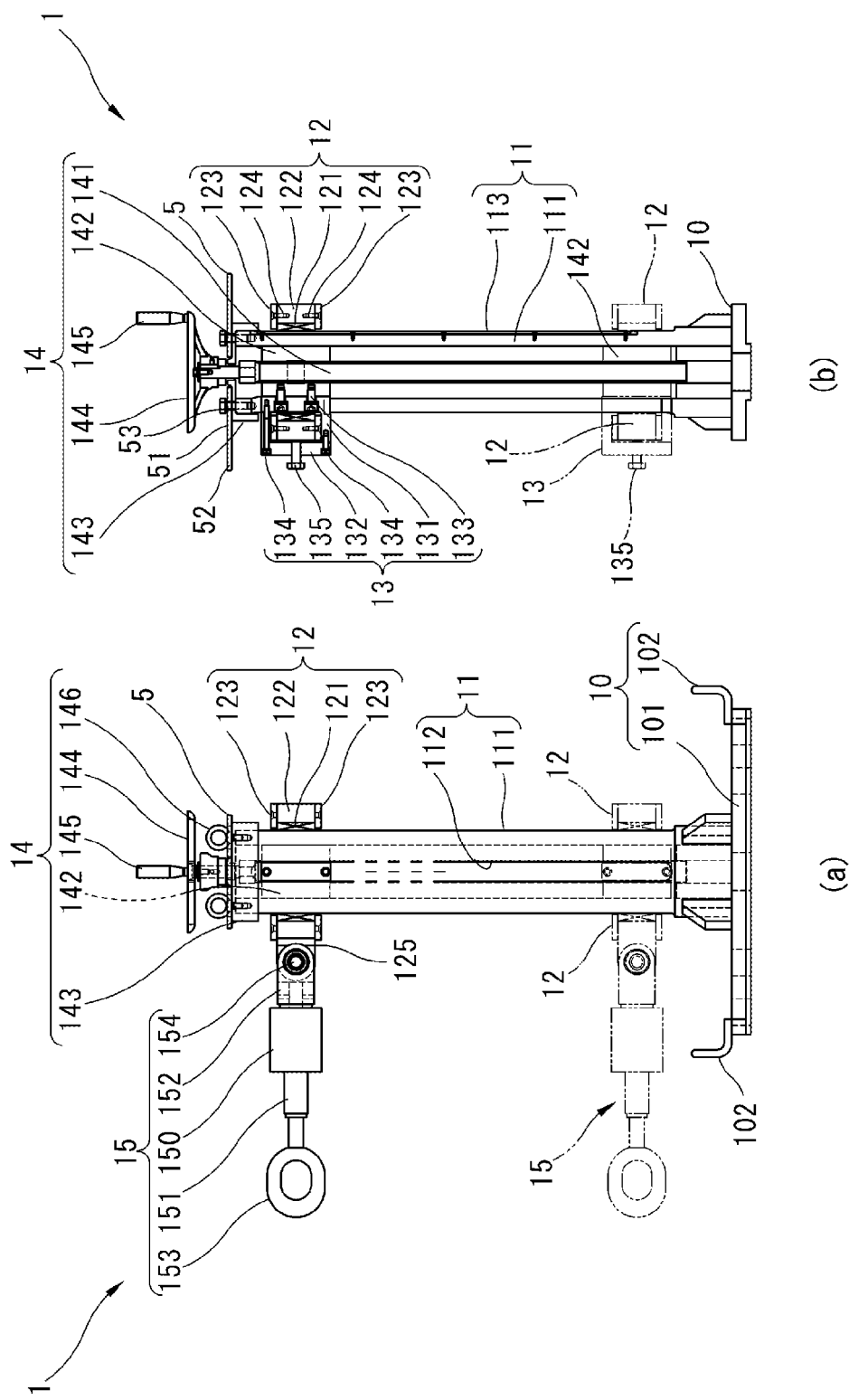
FIG. 2 shows (a) a front view of the vehicle securing apparatus of FIG. 1 in assembled state, and (b) a side view of the vehicle securing apparatus in assembled state.

<Example of Vehicle Securing Apparatus 1> As shown in FIGS. 1 and 2, the vehicle securing apparatus 1 includes a pedestal 10, a column 11, a traveling and rotating part 12, a fixing fitting 13, and a vertical operation part 14.

<Example of Pedestal 10> The pedestal 10 is structured to be mounted to an arbitrary position on the slide rail 22 of the vehicle testing device 2 shown in FIG. 2.

While being structured to be mounted to an arbitrary position on the slide rail 22 shown in FIGS. 1 and 3, the pedestal 10 is composed of a pedestal body 101 having a rectangular plate shape on which the column 11 is placed to stand. A movement handle 102 is fixed to each laterally-extending end portion of the pedestal body 101.

The pedestal body 101 is mounted to an arbitrary position on the slide rail 22 by fixing bolts 103. As shown in FIG. 1 (a), the pedestal body 101 is fixed to the slide rail 22 by screwing the fixing bolts 103 to two nut plates 104, wherein the nut plates 104 are installed in the slide rail 22 and arranged in arbitrary positions, and the fixing bolts 103 are inserted in the pedestal body 101. Each nut plate 104 according to this embodiment has a structure in which two fixing bolts 103 are screwed.

<Example of Column 11> The column 11 is placed to stand on the pedestal 10 as shown in FIGS. 1 and 2.

The column 11 is composed of a cylindrical column body 111 that stands on the pedestal body 101. As shown in FIG. 2, the column body 111 is formed with a slot 112 that extends in a height direction of the column body 111 and restricts vertical movement of the traveling and rotating part 12. As shown in FIG. 1 (a) and 2 (b), the column body 111 is further provided with an indicator scale 113 indicating the height position of the traveling and rotating part 12.

<Example of Traveling and Rotating Part 12> As shown in FIGS. 1 (a) and (d), the traveling and rotating part 12 is coupled via a coupling fitting 15 with a chain 9a for pulling the test vehicle 3, and is arranged coaxially with the column 11, and is structured to travel vertically and rotate horizontally.

As shown in FIG. 2, the traveling and rotating part 12 includes a movable bush 121, a movable fitting 122, and holding lids 123.

The movable bush 121 is in surface-to-surface contact with an outer peripheral surface of the column body 111. The movable bush 121 is implemented by a well-known oilless bearing (self-lubricating bearing).

The movable fitting 122 is arranged around the column body 111 via the movable bush 121. On an outer peripheral surface of the movable fitting 122, a fitting coupling part 125 is provided to project outwardly and is connected to the coupling fitting 15 for the chain 9a connected to the test vehicle 3.

The holding lids 123 seal the movable bush 121 with fixing bolts 124 at upper and lower ends of the movable fitting 122 respectively.

<Example of Fixing Fitting 13> As shown in FIG. 2, the fixing fitting 13 is fixed to a sleeve 142 of the vertical operation part 14 while holding the traveling and rotating part 12 horizontally.

The fixing fitting 13 includes a receiving fitting 131 and a holding fitting 132.

The receiving fitting 131 receives the traveling and rotating part 12 horizontally, while being attached to the sleeve 142 of the vertical operation part 14 by fixing bolts 133.

The holding fitting 132 prevents the moving and rotating part 12 from shifting in the vertical direction, while being fixed to the receiving fitting 131 by fixing bolts 134. Furthermore, a fixing bolt 135 is screwed to the holding fitting 132 for holding the traveling and rotating part 12, so that the traveling and rotating part 12 can be fixed at an arbitrary position within a rotation range of 300° as shown in FIG. 1 (d).

<Example of Vertical Operation Part 14> As shown in FIG. 1, the vertical operation part 14 is made to cause the traveling and rotating part 12 to travel vertically by operation of a test operator not shown.

As shown in FIG. 2, the vertical operation part 14 includes a feed screw 141, the sleeve 142, a lid 143, an operation handle 144, and a grip 145.

The feed screw 141 is housed in the column body 111 coaxially with the column body 111, and rotatably supported.

The sleeve 142 is attached to the feed screw 141 via a well-known ball screw mechanism. The receiving fitting 131 of the fixing fitting 13 is attached to the sleeve 142 as described above.

The lid 143 seals an upper end opening of the column body 111. The lid 143 is provided with a plurality of eyebolts 146 as appropriate, wherein each eyebolt 46 is connected to a suspension ring 153 of the coupling fitting 15 shown in FIG. 1 (c) via a shackle 16 shown exemplarily in FIG. 8.

The operation handle 144 is arranged on the lid 143 coaxially with the feed screw 141, for rotating the feed screw 141. The grip 145 is gripped for operation of the operation handle 144.

<Example of Coupling Fitting 15> The coupling fitting 15 couples the traveling and rotating part 12 with the chain 9a connected to the test vehicle 3.

As shown in FIG. 1, the coupling fitting 15 includes a coupling body 151, a coupling part 152, and the suspension ring 153.

The coupling body 151 includes a load cell 150 as a sensor to sense a pulling force of the traveling and rotating part 12.

The coupling part 152 is connected to one end of the coupling body 151, and coupled with a fitting coupling part 125 of the traveling and rotating part 12 so as to be vertically swingable via a rotating shaft 154.

The suspension ring 153 is connected to the chain 9a while being connected to the other end of the coupling body 151.

<Example of Use of Vehicle Securing Apparatus 1 and Its Effects> The following describes an example of use of the vehicle securing apparatus 1 according to the present embodiment with reference to FIGS. 1 and 3.

As shown in FIG. 3, the vehicle securing apparatuses 1 are used together with lateral shake preventing devices 8 in the vehicle testing device 2, for securing the test vehicle 3.

For example, as shown in FIG. 3, the lateral shake preventing device 8 is mounted to an arbitrary position on the slide rail 22 on the front side of the test vehicle 3. On the other hand, the vehicle securing apparatus 1 is mounted by the fixing bolts 103 and the nut plates 104 shown in FIG. 1 to an arbitrary position on a slide rail 22 additionally provided as an extension of the slide rail 22 on the pit cover 20.

Furthermore, the lateral shake preventing device 8 arranged on the rear side of the test vehicle 3 is fixed at an arbitrary position on the slide rail 22 on the rear side. On the other hand, the vehicle securing apparatus 1 arranged on the rear side is mounted by the fixing bolt 103 and the nut plate 104 shown in FIG. 1 to an arbitrary position on the slide rail 22 further rearward of the lateral shake preventing device 8.

Next, the chains 9a and 9b connected to the test vehicle 3 are connected to the vehicle securing apparatus 1 and the lateral shake preventing device 8 via the coupling fittings 15, respectively. Then, with regard to the vehicle securing apparatus 1, the height of the traveling and rotating part 12 with respect to the column 11 is adjusted by the vertical operation part 14 in a state where the tension of the chain 9a is slightly loosened in advance. Furthermore, the connecting portion between the vehicle securing apparatus 1 and the chain 9a is adjusted in the horizontal direction by rotating operation of the traveling and rotating part 12. In this way, the height of the support point of the pulling and the pulling direction with respect to the test vehicle 3 are adjusted.

As described above, the vehicle securing apparatus 1 is provided with the pedestal 10 that can be attached to the slide rail 22, so that the vehicle securing apparatus 1 can be mounted to an arbitrary position on the slide rail 22 that is added forward of or perpendicularly to the existing slide rail 22 of the pit cover 20.

Furthermore, the feature that the vehicle securing apparatus 1 includes the traveling and rotating part 12, makes it possible to adjust the pulling direction and pulling force with respect to the test vehicle 3 as desired. Specifically, the traveling and rotating part 12 can be adjusted within a rotation angle of about 300°. Furthermore, the feature that the oilless movable bush 121 is provided inside the traveling and rotating part 12 as shown in FIG. 2, serves to reduce the contact resistance between the traveling and rotating part 12 and the column 11 when the traveling and rotating part 12 travels vertically and rotates. The surface-to-surface contact between the column 11 and the traveling and rotating part 12 serves to ensure the stability of pulling of the test vehicle 3.

Therefore, the vehicle securing apparatus 1 serves to enhance the flexibility of pulling the test vehicle when securing the test vehicle. This enhances the flexibility (extendability) of the pulling direction for various test vehicles, and the vehicle securing apparatus 1 can be arranged in the vehicle testing device 2 as desired. This makes it possible to flexibly adapt to test environments where the vehicle securing apparatus is placed and used on or around the pit cover. In particular, the test vehicle 3 can be arbitrarily restrained from any position inside and outside the pit cover 20 wherein it is not required to rotate the pedestal as in the conventional vehicle securing apparatus, enhancing the efficiency of fixing operation.

In the vehicle securing apparatus 1 described above, the column 11 is arranged on the slide rail 22 of the vehicle testing device 2 via the pedestal 10. However, the column 11 does not need to be mounted on the slide rail 22. For example, via the pedestal 10, the column 11 may be movably placed to stand on a part other than the slide rail 22 of the vehicle test apparatus 2, or at a predetermined location on a floor surface of the test room where the vehicle test apparatus 2 is placed. Alternatively, the column 11 may be directly fixed to stand on a part other than the slide rail 22 or the floor surface without interposition of the pedestal 10.

[Second Embodiment] The fitting coupling part 125 of the traveling and rotating part 12 shown in FIG. 1 may be connected to the chain 9a via the coupling fitting 15 provided with no load cell 150. For example, the coupling fitting 15 of this embodiment is a hook, shackle, etc.

The vehicle securing apparatus 1 including the coupling fitting 15 of the present embodiment makes it possible to support a test that requires no measurement of the pulling force of the vehicle securing apparatus 1, in addition to the effects of the first embodiment. It is apparent that the same effect can be obtained even if the load cell 150 is structured to be detached from the coupling fitting 15 in the first embodiment.

Figure 4:
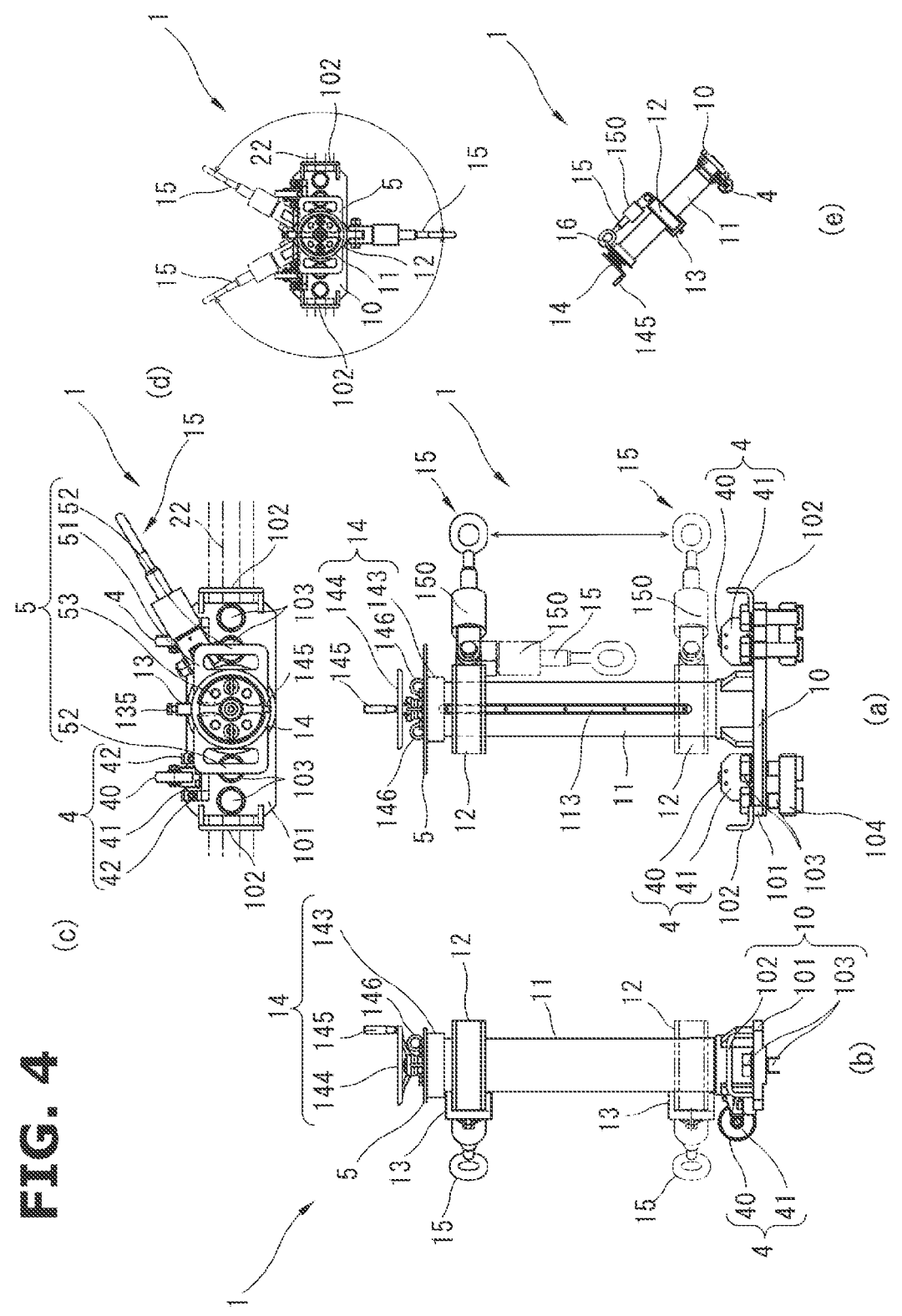

[Third Embodiment] FIG. 4 shows a vehicle securing apparatus 1 according to a third embodiment, which is further provided with casters 4 and a caster movement handle 5 as compared to the vehicle securing apparatus 1 of the first embodiment.

The pair of casters 4 are attached to a longitudinally-extending edge portion of the pedestal 10 so as to allow the vehicle securing apparatus 1 to be moved. The caster 4 of this embodiment includes: a bracket 41 structured to be attached to the longitudinally-extending edge portion of the pedestal 10 with fixing bolts 42; and a wheel 40 rotatably supported by the bracket 41.

The caster movement handle 5 is attached to the column 11, and is gripped for movement of the vehicle securing apparatus 1. The caster movement handle 5 of this embodiment includes: a handle body 51 having a rectangular plate shape and attached to the lid 143 of the vertical operation part 14 by fixing bolts 53; and a pair of grips 52 extending in the lateral direction of the handle body 51.

Figure 5:
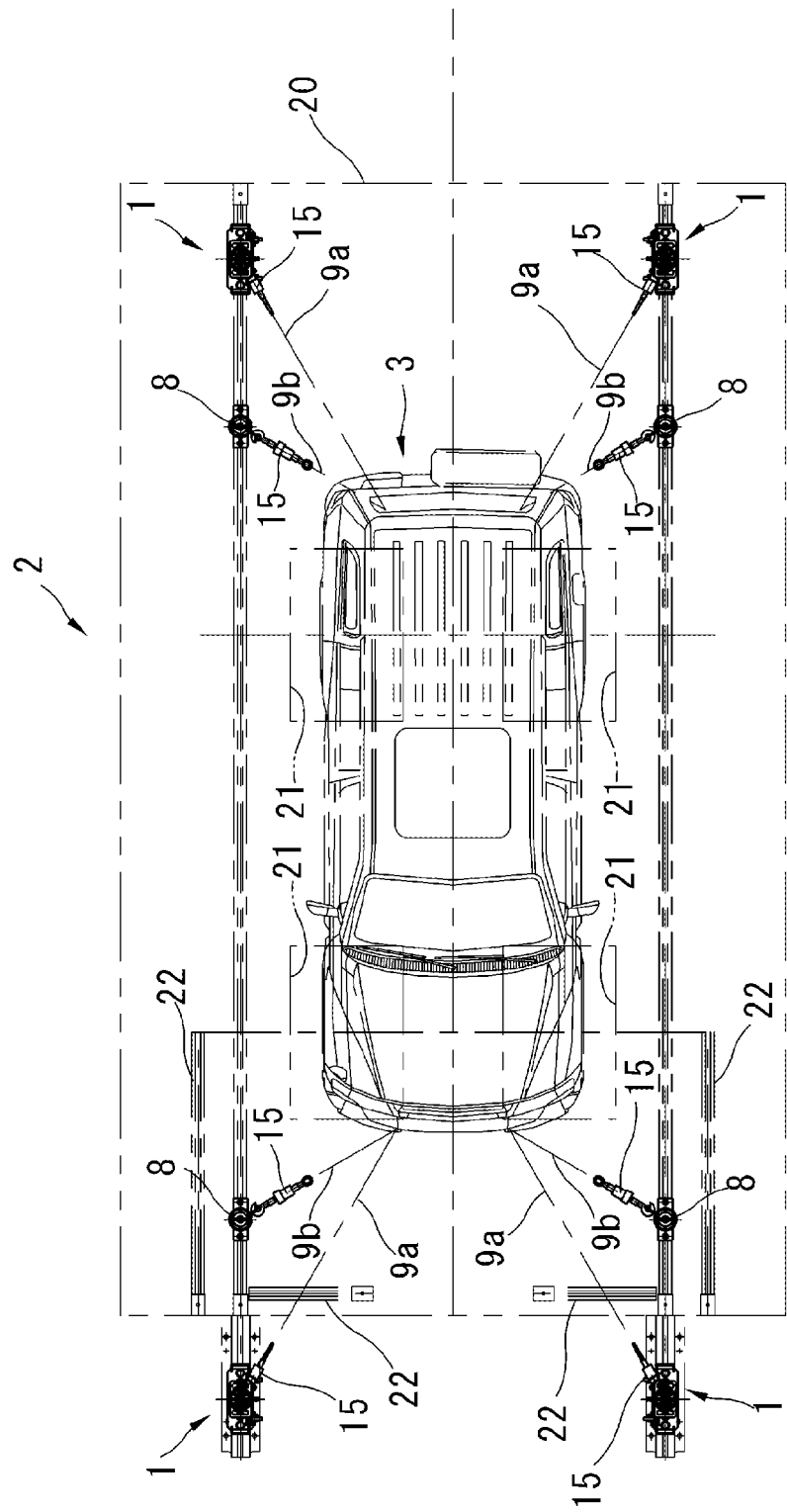
FIG. 5 shows a plan view showing an example of use of the vehicle securing apparatus of FIG. 4.

The following describes an example of use of the vehicle securing apparatus 1 of the present embodiment with reference to FIGS. 4 and 5.

The following describes a case where the vehicle securing apparatuses 1 on the slide rails 22 on the left and right front sides of the test vehicle 3 shown in FIG. 5 are moved to slide rails 22 that are additionally provided in parallel with the existing slide rails 22 on the left and right front sides of the test vehicle 3 on the pit cover 20.

First, the casters 4 are attached to the pedestal 10 of the vehicle securing apparatus 1 of FIG. 4. Next, the caster movement handle 5 is attached to the lid 143 of the column 11 of the vehicle securing apparatus 1. Next, the fixing bolts 103 are removed from the pedestal 10 of the vehicle securing apparatus 1. Then, by gripping the caster movement handle 5 and inclining the vehicle securing apparatus 1, the vehicle securing apparatus 1 is set to be movable. When the coupling fitting 15 is provided with the load cell 150, the vehicle securing apparatus 1 is set to be capable of being stably moved, by coupling the suspension ring 153 of the coupling fitting 15 via the shackle 16 with the eyebolt 146 on the caster movement handle 5.

When the vehicle securing apparatus 1 is to be attached to the existing slide rail 22, it may be difficult to attach the vehicle securing apparatus 1 due to physical interference with the lateral shake preventing device 8 for preventing lateral shake of the test vehicle 3. The interference between the vehicle securing apparatus 1 and the lateral shake preventing device 8 can be prevented by moving the vehicle securing apparatus 1 placed on the existing slide rail 22 shown in FIG. 5 to an arbitrary position on the additional slide rail 22 by means of the casters 4.

Normally, during vehicle testing, a vehicle cooling fan may be arranged on the front side of the test vehicle 3. In particular, according to regulations of WLTP (Worldwide Harmonized Light Vehicles Test Procedure), it is required to set the distance between an outlet of the vehicle cooling fan and the front end of the test vehicle close to about 30 cm. Under the regulations, in case of a conventional vehicle securing apparatus, a chain for restraining the vehicle may interfere with the vehicle cooling fan, making it difficult to secure the vehicle. In particular, when using another vehicle securing apparatus, it is required to move the vehicle securing apparatus as appropriate. Since the weight of the body of the conventional vehicle securing apparatus is heavy, it is difficult for a single operator to move the vehicle securing apparatus when no hoist is provided.

On the other hand, the feature that the vehicle securing apparatus 1 of the present embodiment includes the casters 4 and the caster movement handle 5 serves to allow the vehicle securing apparatus 1 to be moved to an arbitrarily predetermined position efficiently. In particular, for movement from one slide rail 22 to another slide rail 22 or another place (for example, a storage place), the vehicle securing apparatus 1 can be moved by an operator even in a facility provided with no hoist. Furthermore, the vehicle securing apparatus 1 ensures flexibility (expandability) of angles corresponding to various test vehicles 3, and thereby ensures improved flexibility of arrangement and pulling of the vehicle securing apparatus 1.

Figure 6:
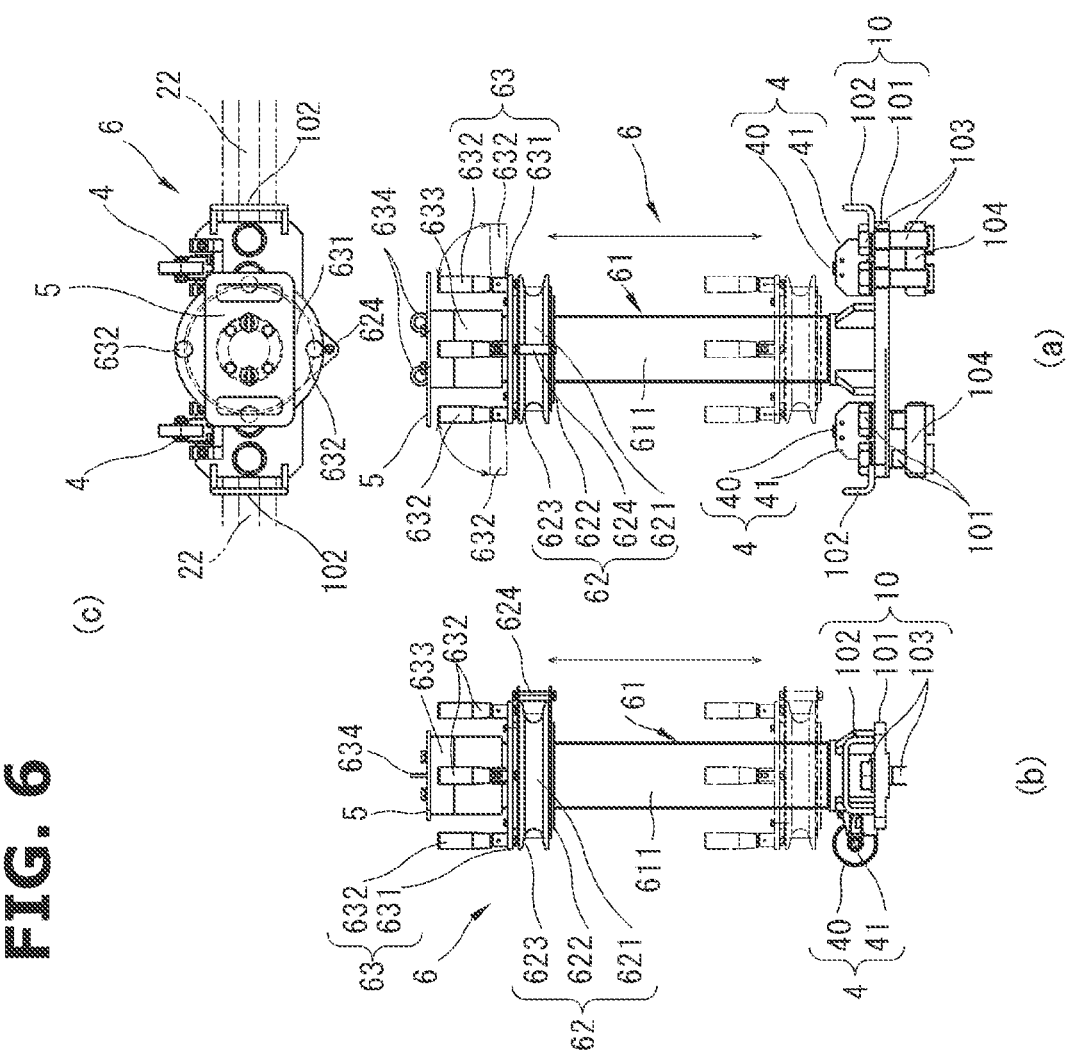
FIG. 6 shows (a) a front view of a vehicle securing apparatus according to a fourth embodiment of the present invention, (b) a side view of the vehicle securing apparatus, (c) a plan view of the vehicle securing apparatus, and (d) a plan view showing an example of movement of the vehicle securing apparatus.
Figure 7:
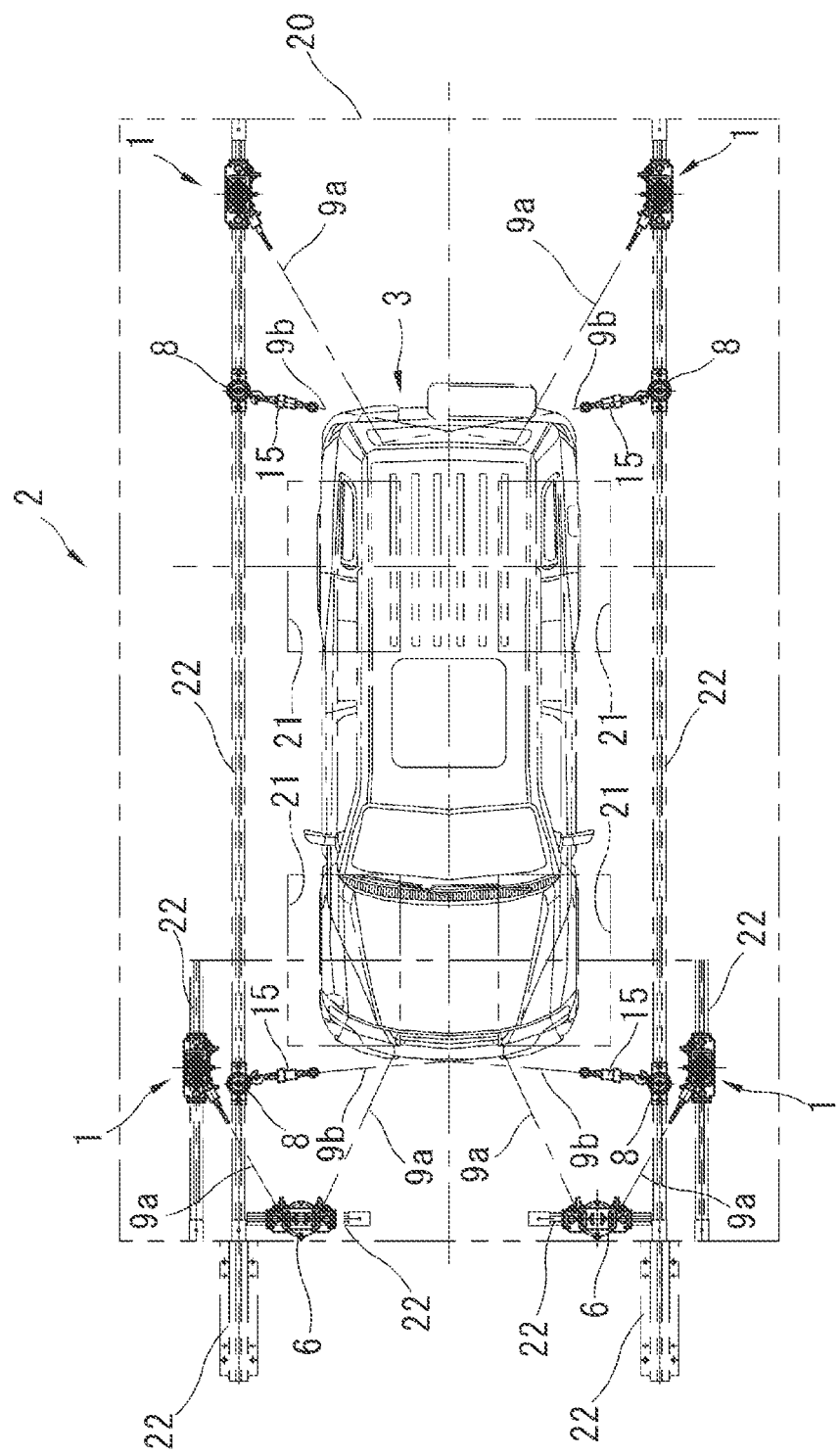
FIG. 7 shows a plan view showing an example of use of the vehicle securing apparatus of FIG. 6.

[Fourth Embodiment] FIG. 6 shows a vehicle securing apparatus 6 according to a fourth embodiment used to assist the vehicle securing apparatus 1 in pulling the test vehicle 3 provided to the vehicle testing device 2 shown in FIG. 7, for securing the test vehicle 3.

As in the first embodiment, the vehicle securing apparatus 6 is structured to be mounted to an arbitrary position on the slide rail 22 of the pit cover 20, and is structured such that the support point height and direction of the pulling the test vehicle 3 shown in FIG. 7 can be adjusted within respective predetermined ranges.

Specifically, the vehicle securing apparatus 6 includes a pedestal 10, a column 61, a pulley 62, a vertical operation part 63, casters 4, and a caster movement handle 5.

<Example of Column 61> The column 61 is placed to stand on the pedestal 10 as shown in FIG. 6.

The column 61 is composed of a cylindrical column body 611 that stands on the pedestal 10. The column body 611 has an outer periphery formed with an externally-threaded portion not shown where a bearing 622 of the pulley 62 is screwed.

<Example of Pulley 62> The pulley 62 is structured such that a chain 9a connecting the test vehicle 3 and the vehicle securing apparatus 1 is wound around the pulley 62 as shown in FIG. 7, and the pulley 62 is arranged coaxially with the column 61, and structured to travel vertically and rotate horizontally.

The pulley 62 includes: a pulley body 621 formed with a guide groove 623 for guiding the chain 9a; and the bearing 622 provided inside the pulley body 621 and screwed to the column body 611. The pulley body 621 has an end portion provided with a stopper 624 for preventing the chain 9a from moving out of the guide groove 623.

<Example of Vertical Operation Part 63> The vertical operation part 63 is operated by a test operator not shown to move the pulley 62 vertically up and down as shown in FIG. 6.

The vertical operation part 63 includes: a disc part 631 attached to an upper end portion of the bearing 622 coaxially with the bearing 622; and a plurality of operation grips 632 attached to a peripheral portion of the disc part 631 and arranged at equal intervals to be placed in vertical position and placed in horizontal position.

The disc part 631 is further provided with a cylindrical support part 633 that stands on the disc part 631 coaxially with the disc part 631 and supports the caster movement handle 5 horizontally. The caster movement handle 5 is provided with a plurality of eyebolts 634 for lifting as appropriate.

<Example of Use of Vehicle Securing Apparatus 6> As shown in FIG. 7, the vehicle securing apparatus 6 is used in combination with the vehicle securing apparatus 1 and the lateral shake preventing device 8 of the first embodiment in the vehicle testing device 2 so as to secure the test vehicle 3. The vehicle securing apparatus 6 may be used in combination with an existing vehicle securing apparatus not shown as appropriate.

The vehicle securing apparatuses 1 are placed at arbitrary positions on slide rails 22 that are additionally provided in parallel with the existing slide rails 22 on the left and right front sides of the test vehicle 3 on the pit cover 20.

The vehicle securing apparatuses 6 are placed on slide rails 22 that are additionally provided perpendicularly to the existing slide rails 22 on the left and right sides of the test vehicle 3.

Alternatively, similar to the arrangement of the vehicle securing apparatus 1 in FIG. 3, the vehicle securing apparatuses 6 are placed at arbitrary positions on slide rails 22 extended forward from the slide rails 22 on the pit cover 20 on the left and right front sides of the test vehicle 3.

The chain 9b connected to the test vehicle 3 is connected to the lateral shake preventing device 8 via the coupling fitting 15. On the other hand, the chain 9a connected to the test vehicle 3 is connected via the pulley 62 of the vehicle securing apparatus 6 and the coupling fitting 15 to the vehicle securing apparatus 1.

Since the vehicle securing apparatus 6 includes the casters 4 and the caster movement handle 5, the vehicle securing apparatus 6 can be moved by inclining the vehicle securing apparatus 6 similarly to the vehicle securing apparatus 1 of the third embodiment. In particular, the operation grip 632 is capable of being inclined to extend in the horizontal direction (0°), and the pulley 62 can be moved vertically by rotating the pulley 62 around the column 61. When the vehicle securing apparatus 6 is moved to another place (for example, to the added slide rail 22 or a place of storage), the operation grip 632 is arranged to extend in the vertical direction (90°), reducing protrusions of the pulley 62 and thereby reducing physical obstacles during moving operation.

As described above, the feature that the vehicle securing apparatus 6 is composed of the pedestal 10, the column 61, and the pulley 62, serves to ensure the flexibility (extendability) of the support point height and direction of the pulling in accordance with various test vehicles 3, and thereby enhance the flexibility of arrangement of the vehicle securing apparatus as in the first embodiment.

The feature that the vehicle securing apparatus 6 includes the casters 4 and the caster movement handle 5 serves to allow the vehicle securing apparatus 6 to be moved by a single operator. In particular, for movement from one slide rail 22 to another slide rail 22 or another place (for example, a storage place), the vehicle securing apparatus 6 can be moved by an operator even in a facility provided with no hoist. Furthermore, the vehicle securing apparatus 6 ensures flexibility (expandability) of angles corresponding to various test vehicles 3, and thereby ensures improved s flexibility of arrangement and pulling of the vehicle securing apparatus 1.

Figure 8:
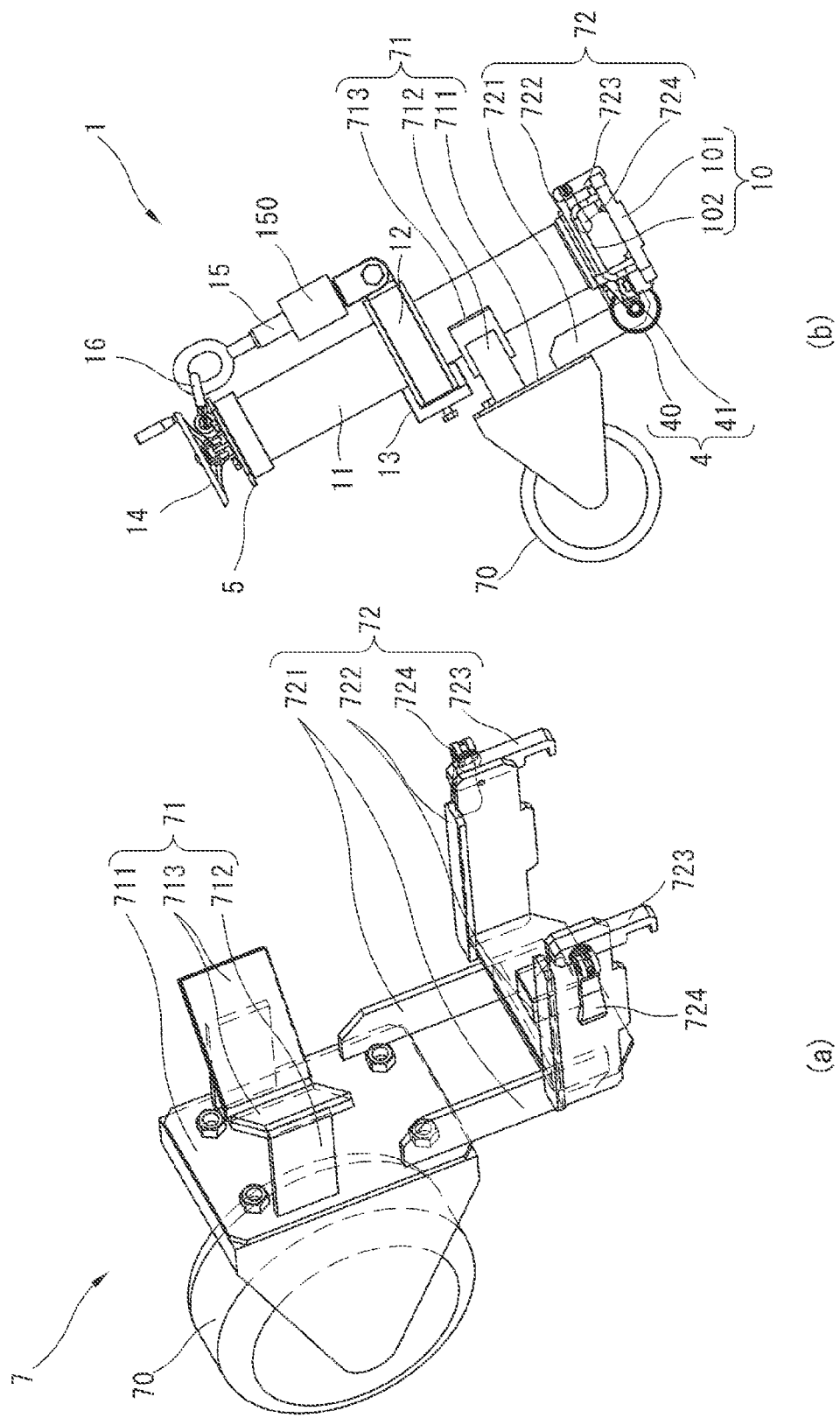
FIG. 8 shows (a) a front view of a tool for moving a vehicle securing apparatus according to a fifth embodiment of the present invention, and (b) a side view of the tool.

[Fifth Embodiment] Each of the vehicle securing apparatuses 1 and 6 according to the third and fourth embodiments may further include an auxiliary caster 7 for assisting the movement of the vehicle securing apparatus 1, 6 as shown in FIG. 8.

The auxiliary caster 7 includes a bracket 71 and a mounting member 72.

The bracket 71 has a first face for rotatably supporting an auxiliary wheel 70 larger in diameter than the wheel 40, and a second face opposite to the first face for supporting the column 11, 61 of the third or fourth embodiment. Furthermore, the second face of the bracket 71 is provided with a column receiver 712 for receiving the column 11, 16. Furthermore, a non-slip member 713 such as a rubber sheet is fixed to a surface of the column receiver 712.

The mounting member 72 is structured to mount the bracket 71 to the longitudinally-extending edge portion of the pedestal 10.

The mounting member 72 includes a support member 721, a fixing member 722, a pair of engaging members 723, and a cam lever 724. The support member 721 supports the bracket 71 vertically with respect to the pedestal 10 above the vicinity of the longitudinally-extending edge portion of the pedestal 10. The fixing member 722 supports the support member 721 vertically with respect to the pedestal 10. The engaging member 723 is structured to engage with the pedestal 10 while being rotatably supported by the fixing member 722. This engagement and disengagement are performed by the cam lever 724 based on a catch clip system.

For moving the vehicle securing apparatus 1, 6 of the third or fourth embodiment, the mounting member 72 of the auxiliary caster 7 is attached to the pedestal 10 of the vehicle securing apparatus 1, 6 by operating the cam lever 724. By this operation, the pair of wheels 40 of the caster 4 of the pedestal 10 of the vehicle securing apparatus 1, 6 and the auxiliary wheel 70 of the auxiliary caster 7 form a three-wheeled vehicle.

The present embodiment serves to prevent toppling during movement and thereby enhance stability and safety, in addition to the effects of the third or fourth embodiment. Furthermore, the feature that the auxiliary casters 7 is detachable from the vehicle securing apparatus 1, 6, serves to allow the vehicle securing apparatus to be made compact and lightweight, and enhance the efficiency of securing the test vehicle 3.

The invention claimed is:

1. A vehicle securing apparatus for pulling and securing a test vehicle provided to a vehicle testing device, the vehicle securing apparatus comprising:
    a column;
    a traveling and rotating part structured to be coupled with a chain for pulling the test vehicle, and arranged coaxially with the column, and structured to travel vertically and rotate horizontally;
    a pedestal on which the column stands, wherein the pedestal is structured to be attached to an arbitrary portion of a slide rail of the vehicle testing device; and
    a coupler structured to couple the traveling and rotating part with the chain, wherein the coupler includes a sensor structured to sense a pulling force of the traveling and rotating part.

2. The vehicle securing apparatus as claimed in claim 1, wherein the coupler is coupled with the traveling and rotating part in a manner to allow the sensor to be detached.

3. The vehicle securing apparatus as claimed in claim 1, further comprising a pair of casters attached to a longitudinally-extending edge portion of the pedestal, and structured to allow the vehicle securing apparatus to be moved.

4. The vehicle securing apparatus as claimed in claim 3, further comprising an auxiliary caster attached to the longitudinally-extending edge portion of the pedestal, and arranged between the pair of casters, and structured to assist the vehicle securing apparatus in being moved.

5. The vehicle securing apparatus as claimed in claim 2, further comprising a pair of casters attached to a longitudinally-extending edge portion of the pedestal, and structured to allow the vehicle securing apparatus to be moved.

6. A vehicle securing apparatus for pulling and securing a test vehicle provided to a vehicle testing device, the vehicle securing apparatus comprising:
- a pedestal structured to be attached to an arbitrary portion of a slide rail of the vehicle testing device;
- a column standing on the pedestal;
- a pair of casters attached to a longitudinally-extending edge portion of the pedestal, and structured to allow the vehicle securing apparatus to be moved;
- a caster movement handle attached to the column, and structured to be gripped during the movement of the vehicle securing apparatus;
- a traveling and rotating part structured to be coupled with a chain for pulling the test vehicle, and arranged coaxially with the column, and structured to travel vertically and rotate horizontally; and
- a coupler structured to couple the traveling and rotating part with the chain, wherein the coupler includes a sensor structured to sense a pulling force of the traveling and rotating part.

7. The vehicle securing apparatus as claimed in claim 6, further comprising an auxiliary caster attached to the longitudinally-extending edge portion of the pedestal, and arranged between the pair of casters, and structured to assist the vehicle securing apparatus in being moved.

* * * * *